Patented Nov. 2, 1948

2,452,669

UNITED STATES PATENT OFFICE 2,452,669

COPOLYMERIZATION OF POLYESTERS AND VINYL COMPOUNDS

Max M. Levine, Rochester, N. Y., assignor, by mesne assignments, to Cornell Aeronautical Laboratory, Inc., Buffalo, N. Y., a corporation of New York No Drawing. Application February 8, 1945, Serial No. 576,895

2 Claims. (Cl. 260—45.4)

This invention relates to the polymerization of organic compounds to form resinous materials. More particularly, it relates to a method and composition for accelerating the copolymerization to the hard infusible state of polyesters and vinyl compounds.

Copolymerization of polyesters and vinyl compounds is accomplished with the aid of an organic peroxide such as benzoyl peroxide as a catalyst. The speed of such catalyzed polymerizations is such that the use of heat or ultra-violet light is often required to bring the polymerization down to a reasonable time. Thus temperatures of 50° C. to 150° C., applied for a few minutes or several hours, depending on the nature and concentration of the catalyst, and other factors, may be necessary or desirable. At ambient temperatures, such as 20° to 30° C., such reactions may require several days or weeks.

It is therefore an object of this invention to provide a method and composition for accelerating the copolymerization of polymerizable polyesters and vinyl compounds. Another object is to provide such a method and composition which will reduce or eliminate the necessity of applying heat or ultra-violet light in accomplishing such polymerizations. Other objects will appear hereinafter.

These objects are accomplished by adding a basic organic nitrogen compound to the polymerizable mass.

The present invention is applicable to the copolymerization of a number of different polyesters with vinyl compounds, in which an organic peroxide may function as a polymerization catalyst. Examples of polyesters are diethylene glycol maleate, triethylene glycol maleate, tetraethylene glycol maleate, hexamethylene glycol maleate, diethylene glycol chloromaleate, 2 ethyl 1, 3 hexanediol maleate and 2, 3 butanediol maleate. Styrene is the preferred vinyl compound, but other vinyl compounds or other unsaturated compounds which copolymerize with polyesters may also be used, such as vinyl acetate and methyl methacrylate.

Materials as described above are generally polymerized in the presence of benzoyl peroxide or other organic peroxides as catalysts. Examples of such other organic peroxides are lauryl peroxide, diacetyl peroxide and acetyl benzoyl peroxide. The quantity of such peroxide is preferably between 0.1 and 5 per cent by weight of the polymerizable material.

As stated hereinabove, the application of heat has generally been necessary to polymerize compounds of the type described. It has now been found, in accordance with this invention, that it is possible to polymerize such compounds in a relatively short period of time without the external application of heat by incorporating in the polymerizable mass a basic organic nitrogen compound, the material so added for convenience being termed as "promoter." Among the amines, the tertiary hydroxyalkyl amines, particularly triethanolamine and triisopropanolamine, have been found to be by far the most suitable, from the point of view of both availability and effectiveness. Other amines which are partially effective are ethanolamine, diethanolamine, tetraethanolamine hydroxide, methyl diethanolamine, 3-dimethylamine-1, 2 propandiol, triethanolamine diacetate, meta toluidine, diethylene triamine, hydroxyethyl ethylene diamine, aminoethanolamine, tributylamine and trimethylaminomethane. Suitable heterocyclic basic nitrogen compounds are pyridine, piperidine, picolines, lutidines, quinoline and derivatives thereof, and morpholine and derivatives thereof. Practically all of these materials, however, except the tertiary hydroxyalkyl amines, are not sufficiently effective to promote the polymerization to complete hardness without external heat in a shorter time than could be accomplished without the use of a promoter. In addition, many are so expensive as to be commercially impracticable. In the use of all the above promoters, heat is not only unnecessary, but with some polymerizable materials the reaction proceeds less rapidly with heat and a promoter than either with the promoter without heat or with heat without the promoter.

The quantity of promoter added to the polymerizable mass should of course be sufficient to produce an accelerating effect. At the same time, the quantity should not be so large that it will unduly impair the structural strength characteristics of the resulting polymer, or that it will accelerate the polymerization to such an extent that a rigid mass is formed before there is sufficient time to mold the mass into the required shape. Suitable quantities have been found to be between 1 and 20 per cent by weight of promoter, based on the weight of the polymerizable material.

Having described the invention generally, the following specific examples are hereby given:

Example 1

To a solution composed of 60 parts of diethylene glycol maleate, (acid number 30), 30 parts of styrene, 10 parts of methyl acrylate, and 0.01 part of hydroquinone, there was added 1 part of benzoyl peroxide and 10 parts of triethanolamine. After 10 minutes at room temperature this solution formed a clear soft gel. An exothermic reaction then began, which resulted in the formation of a clear light yellow hard plastic after 22 minutes total elapsed time. The rise in temperature occasioned by the reaction in a 5 gram sample was 290° F., without the application of external heat. A similar solution without the triethanolamine remained fluid for 5 days at room temperature and then gradually began to form a soft gel. A similar solution in the absence of both triethanolamine and benzoyl peroxide was still fluid after 10 weeks at room temperature.

*Example 2*

The same procedure as in Example 1 was followed, except that only 4 parts of triethanolamine was used. The reaction followed a similar course, but the gelation and solidification times were 80 minutes and 101 minutes, respectively, without the external application of heat.

The above examples are merely illustrative of the present invention, and it is therefore understood that the invention is not to be limited, except as defined in the appended claims.

I claim:

1. In the copolymerization of a polyester taken from the class consisting of diethylene glycol maleate, triethylene glycol maleate, tetraethylene glycol maleate, hexamethylene glycol maleate, diethylene glycol chloromaleate, 2 ethyl 1, 3 hexanediol maleate and 2, 3 butanediol maleate with an ethylenic unsaturated compound copolymerizable with such polyester in the presence of an organic peroxide as a catalyst, the method of accelerating the copolymerization comprising conducting the same in the presence of an organic peroxide and 1 to 20 percent, based upon the weight of the copolymerizable material, of a compound of the group triethanolamine, triisopropanolamine and methyl diethanolamine.

2. In the copolymerization of a polyester taken from the class consisting of diethylene glycol maleate, triethylene glycol maleate, tetraethylene glycol maleate, hexamethylene glycol maleate, diethylene glycol chloromaleate, 2 ethyl 1, 3 hexanediol maleate and 2, 3 butanediol maleate with an ethylenic unsaturated compound copolymerizable with such polyester in the presence of an organic peroxide as a catalyst, the method of accelerating the copolymerization comprising conducting the same in the presence of an organic peroxide and 1 to 20 percent, based upon the weight of the copolymerizable material, of triethanolamine.

MAX M. LEVINE.

REFERENCES CITED

The following references are of record in the file of this patent:

UNITED STATES PATENTS

| Number | Name | Date |
| --- | --- | --- |
| 2,255,313 | Ellis | Sept. 9, 1941 |

FOREIGN PATENTS

| Number | Country | Date |
| --- | --- | --- |
| 540,167 | Great Britain | Oct. 8, 1941 |